United States Patent Office 3,031,492
Patented Apr. 24, 1962

3,031,492
NITRAMINO ESTERS
Milton B. Frankel, Pasadena, and Karl Klager, Monrovia, Calif., assignors to Aerojet-General Corporation, Azusa, Calif., a corporation of Ohio
No Drawing. Filed Aug. 22, 1955, Ser. No. 529,946
3 Claims. (Cl. 260—482)

This invention relates to new compositions of matter and a method for their preparation. In particular, it relates to nitramino esters having the general formula:

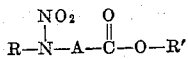

wherein R is an alkyl radical, A is an alkylene radical and R' is an alkyl or nitroalkyl radical.

These compounds are excellent plasticizers for nitropolymers, such as the polyurethane plastics disclosed in assignee's copending application Serial No. 422,649, filed April 12, 1954 and now abandoned, and nitrocellulose. Commercial plasticizers used at the present time are non-explosive and hence detract from the explosive power of the nitropolymers into which they are incorporated. The compounds of this invention, however, are not only plasticizers but also exhibit high explosive energy, as evidenced by their specific impulses.

The nitropolymers can be polymerized in the presence of the plasticizers of this invention or the plasticizer can be mixed into the nitropolymer after polymerization. The plasticizer is incorporated into the nitropolymer in amounts preferably from about 10% to about 40% by weight of the composition.

The nitramino esters of this invention are prepared by reacting a nitramino acid or acid halide with an alcohol, in accordance with the general reaction scheme set forth below:

wherein R is an alkyl radical, A is an alkylene radical, R' is an alkyl or nitroalkyl radical and Z is a carboxy, carbonyl halide or nitrile radical.

The acid halides used as starting materials can be prepared by reacting the corresponding nitramino acids with thionyl chloride. Nitramino acids are prepared by hydrolysis of their corresponding nitriles, as disclosed in our copending application Serial No. 514,386, filed June 9, 1955 and now abandoned. Either acids or acid halides can be employed as starting materials in the practice of our invention, however, we prefer to use acid halides due to the superior yields and faster reaction rates obtained.

The nitriles react with an alcohol, preferably in the presence of an acid such as HCl, to form an imino ester which yields the desired ester upon hydrolysis.

Increased smoothness of reaction is obtained when the reaction is conducted in the presence of a solvent such as absolute ether, chloroform or ethylene dichloride. The reaction is preferably conducted in the presence of a Friedel-Crafts catalyst such as aluminum chloride, titanium tetrachloride, antimony pentachloride, boron trifluoride, ferric chloride, etc., due to the improved yields obtained.

To more clearly illustrate this invention, the following examples are presented. It is to be understood, however, that these examples are presented merely as a means of illustration and are not intended to limit the scope of the invention in any way.

EXAMPLE I

*Preparation of Methyl 4-Nitrazapentanoate*

A 5-liter three-necked flask, equipped with condenser, thermometer, mechanical stirrer and gas inlet tube was charged with 1290 gm. (10 moles) of 4-nitrazapentanonitrile, 1300 ml. methanol and 1300 ml. absolute ether. Keeping the temperature at 0–5° C., hydrogen chloride was bubbled into the solution with stirring until the solution became saturated as evidenced by hydrogen chloride fumes escaping the condenser. Considerable heat was evolved and the white crystalline imino ester hydrochloride precipitated. After stirring for 2.5 hours longer at 0–5° C., the mixture was filtered. The solid was washed with absolute ether and thoroughly pressed and sucked as dry as possible.

The colorless crystals of the imino ester hydrochloride were transferred to a 4-liter beaker with 1300 ml. water. The mixture was neutralized by the cautious addition of saturated sodium bicarbonate with hand stirring. About 850 ml. were required. All of the crystals were dissolved and a layer of ether was present. The mixture was heated on a steam bath to 50° C. for about a half hour to complete the hydrolysis. At this point a heavy oil layer was present. The oil was separated and the cooled aqueous phase was extracted with three 800-ml. portions of methylene chloride which were added to the oil. The solution was next washed once with 300 ml. water, then 300 ml. of 3% sodium bicarbonate and with 300 ml. water again. The methylene chloride solution was dried over sodium sulfate and stripped. The residual oil was distilled in vacuo to yield 1000 gm. (61.7%) of a water-white liquid, B.P. 107° C./1 mm., $n_D^{25}$ 1.4694. The specific impulse of methyl 4-nitrazapentanoate was found to be 113 lbf./sec./lbm.

EXAMPLE II

*Preparation of Ethyl 4-Nitrazapentanoate*

Ethyl 4-nitrazapentanoate was prepared in the same manner as the methyl ester utilizing ethanol in place of methanol as the alcohol reactant. The product had a boiling point of 112° C./1.0 mm. and $n_D^{25}$ 1.4644.

EXAMPLE III

*Preparation of 2,2-Dinitropropyl-4-Nitrazapentanoate*

In a one-liter round-bottom flask fitted with a reflux condenser and drying tube, was placed 130.0 gm. (0.78 mole) of 4-nitrazapentanoyl chloride, 500 ml. of dry chloroform, 117 gm. (0.78 mole) of 2,2-dinitropropanol, and 3.5 gm. (0.026 mole) of anhydrous aluminum chloride. The addition of the catalyst caused a vigorous reaction to occur with the strong evolution of hydrogen chloride gas. The solution was refluxed for 1.5 hours to complete the reaction. The reaction mixture was extracted with 250 ml. of cold 6N hydrochloric acid and 250 ml. of cold water, dried, and concentrated leaving 201 gm. (92.2%) of black oil. The oil was crystallized from methanol to give 140.0 gm. (50%) of a white crystalline solid, M.P. 39.5–40° C. The specific impulse of 2,2-dinitropropyl-4-nitrazapentanoate was found to be 193 lbf./sec./lbm.

EXAMPLE IV

*Preparation of 2,2,2-Trinitroethyl-4-Nitrazapentanoate*

In a 500-ml. round bottom flask fitted with a reflux condenser and drying tube, was placed 26.6 gm. (0.16 mole) of 4-nitrazapentanoyl chloride, 28.9 gm. (0.16 mole) of 2,2,2-trinitroethanol, 200 ml. of dry chloroform, and 6.65 gm. (0.05 mole) of anhydrous aluminum chloride. The addition of the catalyst caused a vigorous reaction to occur with the strong evolution of hydrogen chloride gas. The solution was refluxed for an hour to complete the reaction. On cooling an oil separated. The reaction mixture was extracted with 50 ml. of cold 6N hydrochloric acid and 50 ml. of cold water, dried, and concentrated leaving 35 gm. (70.5%) of amber oil.

On setting the oil solidified; recrystallization from anhydrous ether gave white plates, M.P. 53.5–54° C. The elemental analysis of the product is as follows:

Calculated for $C_6H_9N_5O_{10}$—percent C, 23.16; percent H, 2.92; percent N, 22.51. Found—percent C, 23.22; percent H, 2.93; percent N, 22.94.

The compound had a specific impulse of 236 lbf./sec./lbm.

Any member of the disclosed class of nitramino esters can be prepared by reacting an appropriate alcohol with a nitramino acid or acid halide, in accordance with the teachings of this invention. For example, 2-nitroethyl 3-nitrazapentanoate is prepared by reacting 2-nitroethanol with 3-nitrazapentanoic acid, 3-nitrazapentanoyl halide or 3-nitrazapentanonitrile; and 2,2-dinitropropyl 3-nitrazabutyrate is prepared by reacting 2,2-dinitropropanol with 3-nitrazabutanoic acid, 3-nitrazabutanoyl halide or 3-nitrazabutanonitrile in accordance with the method of this invention.

We claim:

1. As compositions of matter, nitramino esters having the formula:

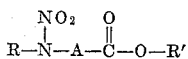

wherein R is a lower alkyl radical, A is a lower alkylene radical and R' is a lower nitroalkyl radical.

2. As a composition of matter, 2,2-dinitropropyl 4-nitrazapentanoate having the structural formula:

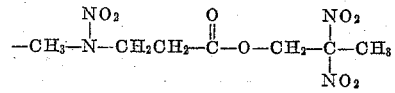

3. As a composition of matter, 2,2,2-trinitroethyl 4-nitrazapentanoate having the structural formula:

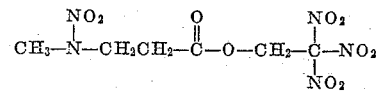

References Cited in the file of this patent
UNITED STATES PATENTS 2,485,855      Bloomquist et al. _____ Oct. 25, 1949

OTHER REFERENCES

Textbook of Organic Chemistry, Wertheim, 2nd Ed. (1946), The Blakiston Co. Philadelphia, pp. 189, 201–3 and 285, 401–2.

Hachk's Chemical Dictionary, 34th Ed., The Blakiston Co. Phila. (1950).

Barrott et al.: J. Chem. Soc. (1951), pp. 1282–89.

The Van Nostrand Chemist's Dictionary, D. Van Nostrand Co., Inc., New York (1953), p. 359.